United States Patent
Dahlen et al.

(10) Patent No.: US 8,650,661 B2
(45) Date of Patent: Feb. 11, 2014

(54) METHOD AND APPARATUS FOR CHARACTERIZING A PROBE TIP

(75) Inventors: Gregory A. Dahlen, Santa Barbara, CA (US); Hao-chih Liu, New York, NY (US)

(73) Assignee: Bruker Nano, Inc., Santa Barbara, CA (US)

( * ) Notice: Subject to any disclaimer, the term of this patent is extended or adjusted under 35 U.S.C. 154(b) by 709 days.

(21) Appl. No.: 12/279,779

(22) PCT Filed: Feb. 20, 2007

(86) PCT No.: PCT/US2007/004574
§ 371 (c)(1),
(2), (4) Date: Aug. 25, 2010

(87) PCT Pub. No.: WO2007/098237
PCT Pub. Date: Aug. 30, 2007

(65) Prior Publication Data
US 2010/0313312 A1 Dec. 9, 2010

Related U.S. Application Data

(60) Provisional application No. 60/743,321, filed on Feb. 20, 2006.

(51) Int. Cl.
*G01Q 70/10* (2010.01)
(52) U.S. Cl.
USPC ............. 850/57; 850/1; 850/2; 850/3; 850/5; 850/6; 850/8; 850/10; 850/52; 850/56; 850/59; 850/60; 850/61

(58) Field of Classification Search
USPC .......... 850/1, 2, 3, 5, 6, 8, 10, 52, 56, 57, 58, 850/59, 60, 61
See application file for complete search history.

(56) References Cited

U.S. PATENT DOCUMENTS

| | | | |
|---|---|---|---|
| 6,218,264 B1 | 4/2001 | Bartha et al. | |
| 6,354,133 B1 | 3/2002 | Yedur et al. | |
| 6,545,273 B1 | 4/2003 | Singh et al. | |
| 6,810,354 B1 | 10/2004 | Dahlen | |
| 2003/0122072 A1* | 7/2003 | Kaito et al. | 250/306 |
| 2004/0211271 A1* | 10/2004 | Han et al. | 73/866.5 |
| 2005/0252282 A1 | 11/2005 | Chand et al. | |

OTHER PUBLICATIONS

Dai, Hongjie; Carbon Nanotubes: Opportunities and Challenges; Surface Science; Jul. 11, 2001; vol. 500; pp. 218-241.

(Continued)

*Primary Examiner* — Nicole Ippolito
(74) *Attorney, Agent, or Firm* — Boyle Fredrickson, S.C.

(57) ABSTRACT

A method and apparatus are provided of characterizing a re-entrant SPM probe tip (30) through a single scan of a characterizer, thus dramatically increasing throughput, accuracy, and repeatability when compared to prior known tip characterization techniques. The characterizer also preferably is one whose dimensions can be known with a high level of certainty in order to maximize characterization accuracy. These dimensions are also preferably very stable or, if unstable, change catastrophically rather than in a manner that is difficult or impossible to detect. A carbon nanotube (CNT), preferably a single walled carbon nanotube (SWCNT), has been found to be well-suited for this purpose. Multi-walled carbon nanotubes (MWCNTs) (130) and other structures may also suffice for this purpose. Also provided are a method and apparatus for monitoring the integrity of a CNT.

35 Claims, 13 Drawing Sheets

(56) References Cited

OTHER PUBLICATIONS

Liu, Lei, Guo, G.Y., Jayanthi, C.S., Wu, S.Y.; Colossal Paramagnetic Moments in Metallic Carbon Nanotori; Physical Review Letters; May 27, 2002; vol. 88, No. 21; pp. 217206-1-217206-4; The American Physical Society.

Dahlen, Gregory, Osborn, Marc, Liu, Hao-Chih, Jain, Rohit, Foreman, William, Osborne, Jason; Critical Dimension AFM Tip Characterization and Image Reconstruction Applied to the 45 NM Node; Proc. of SPIE; 2006; vol. 6152; pp. 61522R-1-61522R-11.

Universal Probe Tip Characterizer; IBM Technical Disclosure Bulletin; Apr. 1997; vol. 40, No. 4; pp. 89-90; IBM Corp.

\* cited by examiner

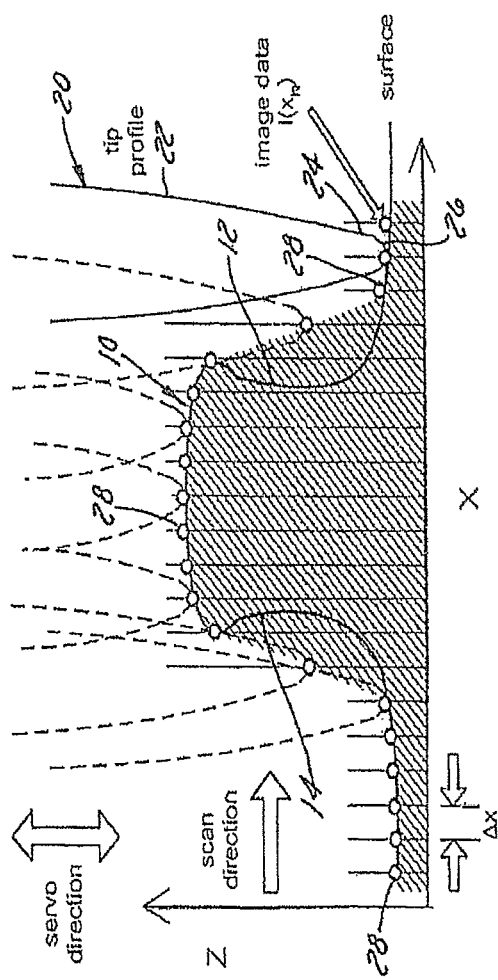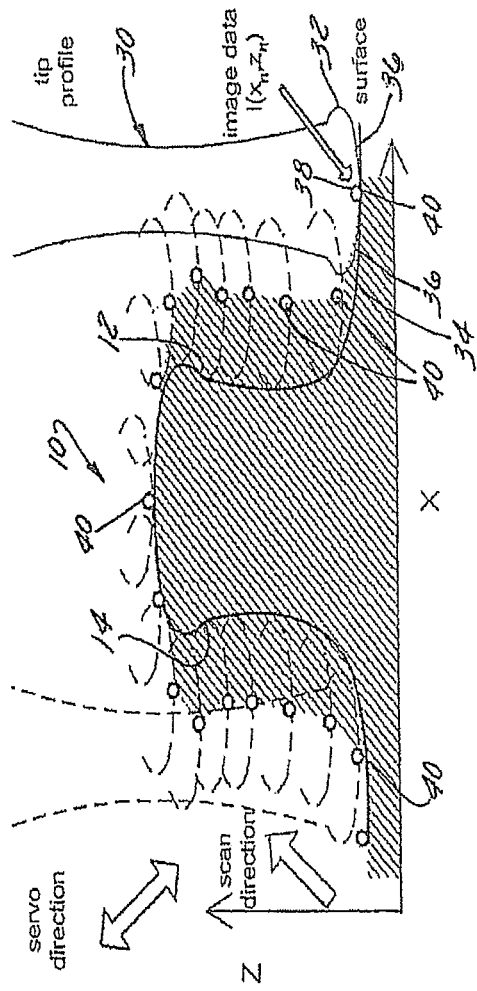

METHOD AND APPARATUS FOR CHARACTERIZING A PROBE TIP

CROSS REFERENCE TO RELATED APPLICATION

This application claims priority under 35 U.S.C. §119(e) to U.S. Provisional Application Ser. No. 60/743,321, filed Feb. 20, 2006, entitled CD AFM Measurements—Development of a Nanotube Characterizer, the contents of which are hereby incorporated by reference in their entirety.

BACKGROUND OF THE INVENTION

1. Field of the Invention

The present invention is directed to scanning probe microscopes, and, more particularly, to a method for determining the shape of a probe tip and for reconstructing a dilated image using the acquired data. It additionally relates to a method and apparatus for monitoring the integrity of a carbon nanotube.

2. Description of Related Art

Scanning probe microscopes (SPMs), such as the atomic force microscope (AFM), are devices which typically use a tip and low forces to characterize the surface of a sample down to atomic dimensions. Generally, SPMs include a probe having a tip that is introduced to a surface of a sample to detect changes in the characteristics of a sample. By providing relative scanning movement between the tip and the sample, surface characteristic data can be acquired over a particular region of the sample and a corresponding map of the sample can be generated.

The atomic force microscope (AFM) is a very popular type of SPM. The probe of the typical AFM includes a very small cantilever which is fixed to a support at its base and which typically has a sharp probe tip attached to the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high resolution three axis scanner acting on the sample support and/or the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. This is accomplished by moving either the sample or the probe assembly up and down relatively perpendicular to the surface of the sample in response to a deflection of the cantilever of the probe assembly as it is scanned across the surface. In this way, the data associated with this vertical motion can be stored and then used to construct an image of the sample surface corresponding to the sample characteristic being measured, e.g., surface topography. Similarly, in another preferred mode of AFM operation, known as TappingMode™ (TappingMode™ is a trademark owned by the present assignee), the tip is oscillated at or near a resonant frequency of the associated cantilever of the probe. The amplitude or phase of this oscillation is kept constant during scanning using feedback signals, which are generated in response to tip-sample interaction. As in contact mode, these feedback signals are then collected, stored and used as data to characterize the sample. Note that "SPM" and the acronyms for the specific types of SPMs, may be used herein to refer to either the microscope apparatus, or the associated technique, e.g., "atomic force microscopy."

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

Notwithstanding the fact that scanning probe microscopes are high resolution instruments, the ultimate resolution of the data obtained by a scanning probe microscope is limited by the physical characteristics of the tip of the probe. More particularly, there are limitations as to how small or sharp the tip can be made. As a result, when imaging fine (e.g., Angstrom-scale) sample features, the tip shape is typically reflected in the acquired data. Stated another way, the acquired AFM images are combination of both the original surface topology and the shape of the probe that was used to acquire the image. The superpositioning of the shape of the probe on the surface topology image is known as image "dilation" and is considered a distortion of the original topography. Because the imaged surface data contains both the features of the sample surface and the probe shape, accuracy is clearly compromised. For many applications, this limitation is negligible. However, for other applications, the degree of accuracy required to resolve the features of the sample surface is significantly greater such that tip shape introduces appreciable error into the acquired data. For instance, in the semiconductor fabrication industry, imaging features such as lines, trenches, and vias with single nanometer accuracy is desired as such features are in the range of 100 nm, and continually getting smaller. With typical tip widths in the range of about 70 nm, this is becoming increasingly difficult. Clearly, in this instance, the tip shape is reflected in the data and must be removed to accurately reconstruct the sample surface.

Moreover, the aforementioned problems can be compounded by the fact that complex sample surface topologies require a commensurate increase in tip shape complexity to image the sample surface. For example, samples may include undercut regions where a particular scan position in the X-Y plane may have multiple vertical or "Z" positions. One such sample feature 10 is shown schematically in FIGS. 1A and 1B and has undercuts 12 and 14 on opposite sides of the feature 10. Two types of known tip shapes are schematically illustrated in FIGS. 1A and 1B in interaction with that sample feature. In FIG. 1A, a probe tip 20 of a traditional scanning probe microscope includes a parabolic, or other pointed shape that is relatively easy to characterize. Tip 20 includes a shaft 22 and a distal end 24 that, although sharp, is typically at least slightly rounded at its active surface 26. (Generally the "active" surface is the point on the probe that is mathematically determined to be that point on the probe that actively interacts with the sample surface, even if other points on the probe actually interact with at least certain parts of the sample surface.) During a scan, which may be one in which the probe operates in an oscillating mode, for instance, tip 20 interacts with the sample feature 10 to image characteristics of the surface of that feature. This interaction may include actual probe-to-sample contact or may stop short of contact with other, near-surface effects of probe/sample interaction being detected.

The actual interaction between the probe tip 20 and the sample 10 occurs at points along the tip profile 28 in FIG. 1A that vary with sample feature shape and with the X position of the tip 20 relative to the sample feature. Importantly, the closest point to the sample is sometimes spaced from the surface of sample feature 10 because the active region 26 of the tip 20 is physically incapable of engaging the sample. This effect results in part from the geometry of the tip 20. Specifically, because the tip 20 is tapered, the active region 26 cannot engage vertical or undercut surfaces on the sample feature 10 as the probe 20 oscillates vertically. The resultant image is shown by the resultant data points 28 and encompasses the hatched regions in FIG. 1A, which illustrate the actual profile generated by scanning the feature 10. The image profile includes distortion resulting both from image dilation due to tip shape and artifacts resulting from the inability of the tip 20 to interact with some surfaces of the sample feature 10.

So-called "re-entrant probes" have been developed partially to address this and similar needs. A re-entrant probe tip is characterized by being wider at its distal end than at the "shaft" or section immediately above the end. It is capable of bilateral scanning of vertical and even undercut surfaces.

One widely used re-entrant tip is the so-called "critical dimension" or CD tip, an example of which is shown schematically at 30 in FIGS. 1B and 2. CD tips 30 have protuberances 32 and 34 in the scan or "x" direction at the bottom end 36, imparting a "boot" shape to the tip 30 when viewed from the "y" direction. The protuberances 32 and 34 can interact with complex surface features including undercuts 12 and 14 and, accordingly, allow imaging of such complex topographies. CD tips having a diameter as small as 30 nm are possible. They can be used to scan surface features having a size of on the order of 10 nm or even less.

However, a CD tip 30, like a traditional tip 20, introduces dilation into the acquired image because it physically occupies a volume or "active region" as shown at 38 that interacts with the sample. The resulting data points are shown at 40 in FIG. 1B. During the course of scanning feature 10, the tip/sample contact point translates across the distal end of the tip (i.e., translating from points 32 to 34 for example) while the tip reference position of the AFM remains fixed at point 38. Consequently, the AFM image incorporates both the shape of the sample feature 10 and the shape of the tip 30. This dilation effect is shown by the acquired data points 40 and the resulting hatched regions in FIG. 1B.

Dilated images using CD or other tips can be "reconstructed" by removing the image distortion due to the tip shape from the dilated image and, accordingly, obtain an image of the actual surface feature. Dilated images can be reconstructed using any of the variety of known techniques such as "slope-matching" and "erosion" reconstruction techniques, both of which are commercially available, for example, in the X3D CD AFM sold by Veeco Instruments, Inc. They are also described, for instance, in "*Tip Characterization Surface Reconstruction Of complex Structures With Critical Dimension Atomic Force Microscopy.*" G. Dahlen et al., 2005.

All reconstruction techniques require actual knowledge of the tip shape or at least critical parameters of that shape. These parameters include profile data of the portion(s) of the tip that interact with the sample during the imaging process. In a CD tip, for example, the portions requiring knowledge include at least the protrusions 32 and 34. The shape of at least these "interacting portions" therefore must first be determined in order to reconstruct the sample surface data from the dilated image data.

Tip shape determination is not a simple task. This is particularly true in the case of a CD tip which, as discussed above, has a rather complex shape. For instance, since virtually any portion of the tip 30, including the bottom 36, protuberances 32 or 34, or sidewalls above the protuberances 32 or 34, may take part in the sample interaction process, it is essential that the shape of all interacting portions of the tip be known for an accurate reconstruction. Tip shape can be acquired from a variety of techniques, such as AFM model based characterizer images, blind tip reconstruction, TEM (Transmission Electron Microscopy), SEM (Scanning Electron Microscopy) methods, or any combination of these methods. However, each method has its own limitations that restrict the utility of its application.

Blind tip reconstruction is a methodology that is based on an assumption that protrusions in the AFM image represent the self-image of the tip, which is equivalent to the statement that sharp features on the sample surface act as the probe to image the AFM tip. This method has proven useful in estimating the outer envelope of the tip geometries when using appropriate characterizer samples. However, blind tip reconstruction cannot be easily used to image complex tip shapes. Moreover, to make the characterizer durable results in material selection that also results in rapid tip wear. At present, this method has not been applied to CD AFM probes.

TEM is an imaging technique in which a beam of electrons is transmitted through the tip, resulting in an enlarged image to appear on a fluorescent screen or layer of photographic film, or to be detected by a CCD camera. TEM is very time consuming and requires painstaking sample preparation. This renders it unsuitable for automated instruments or applications in which throughput is important. It also can damage the tip surface during e-beam exposure. It also cannot be used in situ because it requires that the tip be placed in the sample holder of a transmission electron microscope.

In SEM, an electron beam is focused into a beam with a very fine focal spot sized 1 nm to 5 nm, which is then directed and scattered over a region of the sample surface. Interactions in this region lead to the subsequent emission of electrons, which are then detected to produce an image. SEM has limited resolution and a propensity to damage the tip surfaces when using sufficient magnification for shape characterization. In addition, SEM, like TEM, cannot be used in situ.

The drawbacks of other known tip shape determination techniques lead to the development of a model based characterizer approach for tip shape determination in which the tip scans a "characterizer" of known shape. This scan can be expressed as the equation:

$$P = I_c \theta S_c \quad \quad \text{Equation I}$$

Where:
P = the shape of the tip;
θ = the erosion operator; and
$S_c$ = the shape of the known characterizer.

For CD AFM, the most precise method of tip characterization heretofore available was a "distributed" characterizer consisting of two structures which must be individually scanned to determine the entire tip shape. Referring to FIG. 3, the first structure is typically an Improved Vertical Parallel Surface (IVPS) 50. The typical IVPS has a calibrated width (typically about 100 nanometers) but an unknown height and, accordingly, can only serve to provide a width measurement for the CD tip 30. It is formed from a line feature with extremely smooth sidewalls 52 and 54 and a uniform width.

The IVPS 50 may, for instance, be formed from a single silicon crystal. Similar NanoCD™ structures are available from VLSI and are NIST traceable. They are formed from a polysilicon line protruding from a silicon substrate 56.

The second structure 60, shown in cross-section in FIG. 3, is shaped so as to allow re-entry into the feature in a reverse scan and to allow imaging of the CD tip 30 sidewalls, hence permitting the acquisition of tip profile data that is height-dependent. A Silicon Overhang Characterizer Structure or "SOCS" is suitable for this purpose. A SOCS is fabricated by a combination of vertical dry etching and anisotropic wet etching, thus producing a diamond-shaped trench in a silicon substrate 62. The upper surfaces 64 and 66 of the trench, which are the ones imaged during the characterization process, are upwards sloped and sharpened at their edges 68 and 70 to a radius of below about 10 nm to as little as about 1 nm in a subsequent oxidation step. Engagement of the large trench undercut, including the sharp edge 68 or 70, in a CD scan provides tip profile information and allows characterization of tips 30 with large flare. ("Flare" refers to the widening of the shaft 31 of tip 30 as one proceeds upwardly from its distal end.) The formation of a SOCS and the use of a SOCS to characterize tip shape are disclosed, for example, in U.S. Pat. No. 7,096,711, which is assigned to Veeco Instruments Inc., and the subject matter of which is hereby incorporated by reference in its entirety. The removal of the SOCS characterizer dilation from the image of the tip/SOCS scan is described in U.S. Pat. No. 6,810,354, which is also assigned to Veeco Instruments Inc.

While the two-stage characterization process described above is effective, it exhibits significant drawbacks and disadvantages.

For instance, the IVPS 50 and the SOCS 60 cannot be formed on a single structure. Hence, two separate structures must be scanned each time the tip 30 is characterized. This can be a very time-consuming process.

The IVPS 50 and SOCS 60 also have limitations that restrict throughput and/or repeatability. For instance, it has been discovered that IVPS width shows considerable lot-to-lot variation, as well as an average that is about 20% more than the fabricator-stated width. These deviations adversely affect both accuracy and repeatability of width measurement. Consequently, the IVPS 50 must be calibrated with a golden line or other reference structure such as a NanoCD prior to its use. This adds complexity and cost to the tip characterization process.

In addition, the properties of an IVPS 50 vary significantly along the length of a given IVPS. It is therefore important to carefully register the tip 30 to the same location along the length of the IVPS 50 during every characterization process using, for example, a so-called 2DSPM zoom technique. In this process, a two-line reference scan is first performed, and a y-reference position is defined using pattern recognition. Then, a second two-line reference scan is performed, and an x-reference position is determined. Finally, a high-resolution data scan is performed with relative offsets to the x and y. This need for registration considerably increases the complexity and time of the characterization process.

Moreover, the edge of a SOCS must be very sharp to provide precise tip profile data. The actual radius is unknown and must be assumed for removing (i.e., "eroding") the characterizer edge radius on the acquired scan and thus allow high fidelity tip reconstruction. Typically, the radius estimates range from 1-5 nm. Any errors in this assumption result in a corresponding error in the reconstruction calculations. The characterizer edge uncertainty problem is compounded by edge non-uniformity and the fact that edge wear and breakage occur over time. For instance, an edge that initially has a radius of less than 5 nm may wear or break after repeated characterization interactions with a tip and, accordingly, have a radius of 10 nm or even larger. This change in edge radius is directly dilates the tip/characterizer image, yet only a constant edge radius value is removed during subsequent image reconstruction. As a result, the larger edge radius of a broken or worn characterizer edge translates into a larger reconstructed (or "deconvolved") tip edge radius. This imparts a higher than actual tip vertical edge height during qualification analysis and can lead to an erroneous determination that the tip has failed. For instance, a worn SOCS vertical edge can lead to a determination that the vertical edge height of a CD tip has increased from 15 to 25 nm when, in fact, the tip vertical edge height is less than 20 nm. If the user-selected "failure threshold" is 20 nm, the operator (or automated software) will determine that the tip has failed and discard the tip when in fact it is perfectly usable. This is extremely undesirable given the fact that CD tips cost hundreds or even thousands of dollars a piece.

In addition, the angled shape of edge of a SOCS (having an included angle of about 54.7°) prevents it from making physical contact with the distal end of the probe 30. This inability leads to "blind zones" during characterization of re-entrant tips in which the "reentrancy" or overhang of the tip exceeds that of the characterizer. Consequently, the reconstructed tip shape retains residual distortion in this region. That distortion may then be transferred into the reconstructed sample image.

The need therefore has arisen to provide an SPM characterizing procedure having higher throughput than heretofore known procedures.

The need has additionally arisen to provide a tip characterization procedure that can be performed in a single scan, i.e., without disengaging the tip from the sample containing first characterizer and moving to and engaging a second characterizer. Meeting this need will result in approximately halving the time for tip characterization and directly improves AFM throughput.

The need has additionally arisen to provide a tip characterizer that has precisely known dimensions which remain stable after repeated characterization cycles.

Finally, the need has additionally arisen to provide a tip characterizer that can make full physical contact with the CD AFM probe distal end.

SUMMARY OF THE INVENTION

In accordance with a first aspect of the invention, a method and apparatus are provided for characterizing a re-entrant SPM probe tip through a single scan of a single characterizer, thus dramatically increasing throughput, accuracy, and repeatability when compared to prior known tip characterization techniques. (The single scan of a single characterizer is not essential to the invention. It can be advantageous to scan different characterizers of different orientations in order to obtain three dimensional imaging of the tip). The characterizer also preferably is one whose dimensions can be known with a high level of certainty in order to maximize characterization accuracy. These dimensions are also preferably very stable or, if unstable, change catastrophically rather than in a manner that is difficult or impossible to detect. A carbon nanotube (CNT), preferably a single walled carbon nanotube (SWCNT), has been found to be well-suited for this purpose. Multi-walled carbon nanotubes (MWCNTs) and other structures may also suffice for this purpose.

The characterizer preferably is held in tension at least one end and positioned such that the sides and bottom of the tip can contact the characterizer without obstruction. One arrangement for achieving this goal is to suspend the characterizer across a trench so that the tip may be positioned in the trench and engage the characterizer. For instance, the ends of the characterizer may be embedded in the substrate material abutting the trench or held on posts extending above the surface of a substrate. The characterizer may be linear to provide two-dimensional tip characterization or nonlinear (typically rectangular or circular) to provide three dimensional characterization. CNTs are well suited for this purpose as well.

In accordance with another aspect of the invention, a characterizer is provided whose integrity can be easily monitored in situ so as to permit the use of a different, undamaged, characterizer or characterizer segment after detecting wear or damage. CNTs are also well suited for this purpose. This characteristic of the preferred characterizer is usable for re-entrant probes, standard probes, and any other device requiring characterization. Indeed, it is useful in any application in which it is desired to monitor the integrity of a CNT.

In accordance with still another aspect of the invention, a process and system are provided for reconstructing a dilated image using data obtained through the above-described characterization technique.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 1A is a somewhat schematic side view of the interaction between a traditional parabolic SPM tip and a sample feature;

FIG. 1B is a somewhat schematic side view of the interaction between a CD SPM tip and a sample feature;

DETAILED DESCRIPTION OF THE PREFERRED EMBODIMENTS

As discussed in the "Summary" section above, the invention relates to a process and apparatus for characterizing a re-entrant probe tip in a single pass and in a highly precise and repeatable manner. The characterization procedures and structures described herein can be used to characterize a wide variety of re-entrant probe tips. Hence, while a preferred embodiment of the invention will now be described in conjunction with the CD tip of an AFM, it should be understood that the characterizer could be used to determine the shape of other AFM probe tips, tips for other SPMs, or other structures entirely. In addition, the nanotube integrity checking techniques described herein are applicable to any application in which nanotube integrity is important.

Figure 4:
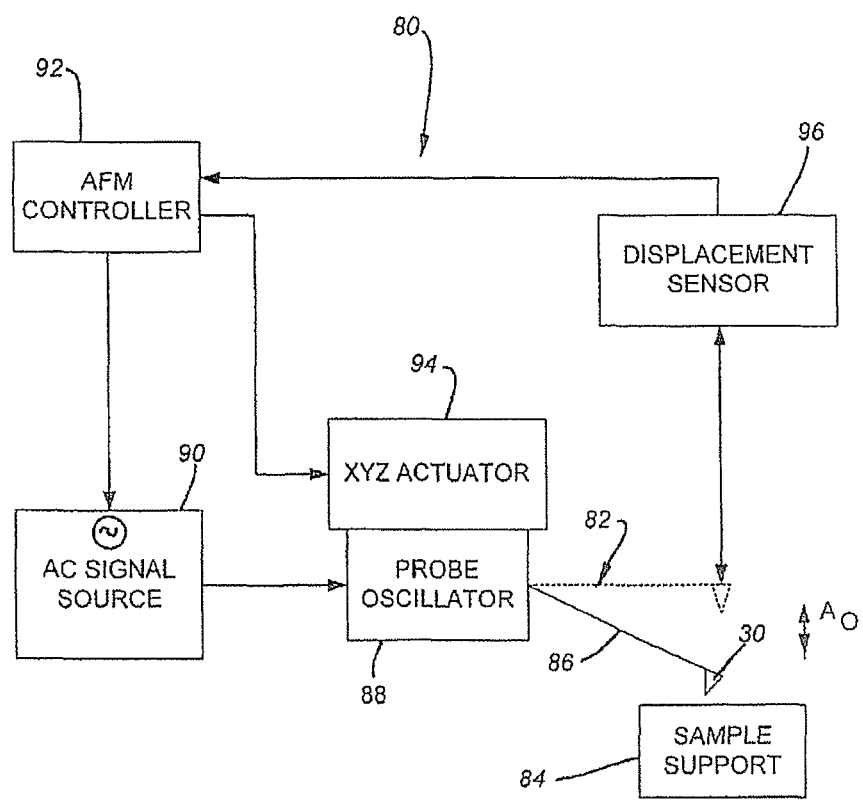
FIG. 4 schematically illustrates an AFM having a CD probe, the tip of which can be characterized using a tip characterizer constructed in accordance with a preferred embodiment of the invention.

An AFM 80 that is capable of implementing the techniques described herein is illustrated in FIG. 4. The AFM includes 80 a probe 82 mounted over a sample support 84. The probe 82 includes a cantilever 86 and a tip 30 mounted on the free end portion of the cantilever 86. The probe 82 is coupled to an oscillating actuator or drive 88 that is used to drive probe 82 to oscillate, in this case, at or near the probe's resonant frequency. The oscillating drive 88 may be coupled to a scanner 94 (described below) and probe 82 or may be formed integrally with the cantilever 86 of probe 82 as part of a self-actuated cantilever/probe. An electronic signal is applied from an AC signal source 90 under control of an AFM controller 92 to drive 88 to oscillate probe 82, preferably at a free oscillation amplitude $A_O$. Controller 92 typically consists of at least one computer and associated electronics and software that perform the tasks of data acquisition and control of the AFM. The controller 20 may consist of a single integrated analog and/or digital unit, or may consist of a distributed array of electronics and software. The controller 92 may use a typical desktop computer, a laptop computer, an industrial computer and/or one or more embedded processors.

Probe 82 can also be actuated to move in the x, y, and z directions relative to the sample support 84 using a suitable actuator or scanner 94 controlled via feedback by controller 92. Moreover, though the actuator 94 is shown coupled to the probe 82, the actuator 94, or a portion of it, may be employed to move sample support 84. For instance, the probe 82 may be mounted on a Z actuator that drives the probe to move in a vertical or z direction, and the sample support 84 may be mounted on a separate, x-y actuator that drives the sample support 84 to move in the x-y plane.

In operation, as the probe 82 is oscillated and brought into contact with a sample on the sample support 84, sample characteristics can be monitored by detecting changes in the oscillation of probe 82. In particular, a beam is directed towards the backside of probe 82 from a laser (not shown) and is then reflected towards a detector 96, such as a four quadrant photodetector. As the beam translates across the detector 96, appropriate signals are transmitted to controller 92, which processes the signals to determine changes in the oscillation of probe 82. Controller 92 typically generates control signals to actuate the z-actuator of the actuator 94 under feedback to maintain a setpoint characteristic of the oscillation of probe 82. For example, controller 92 may be used to maintain the oscillation amplitude at a setpoint value, $A_S$, to insure a generally constant force between the tip and the sample. Alternatively, a setpoint phase or frequency may be used. A workstation is also provided, in the controller 92 and/or in a separate controller or system of connected or stand-alone controllers, that receives the collected data from the controller and manipulates the data obtained during scanning to perform the point selection, curve fitting, and distance determining operations. The workstation can store the results in memory, use them for additional calculations, and/or display them on a suitable monitor, and/or transmit them to another computer.

Figure 2:
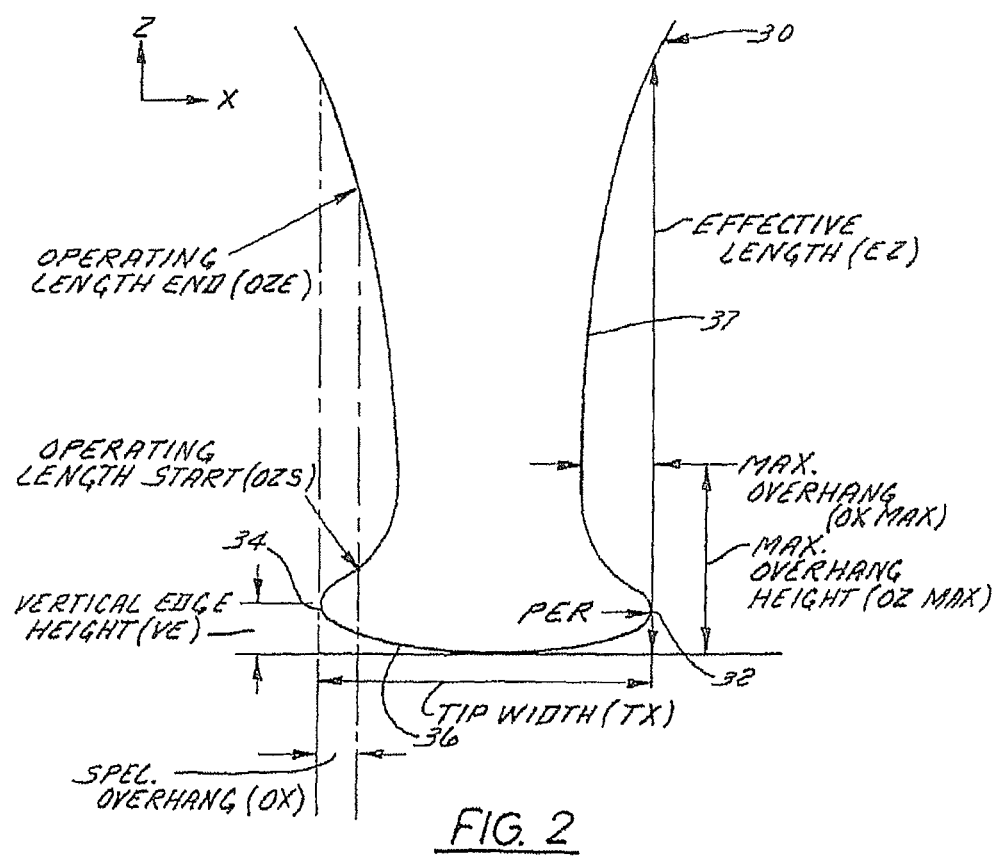
FIG. 2 is a somewhat schematic enlarged side view of the CD tip shown in FIG. 1B.
Figure 3:
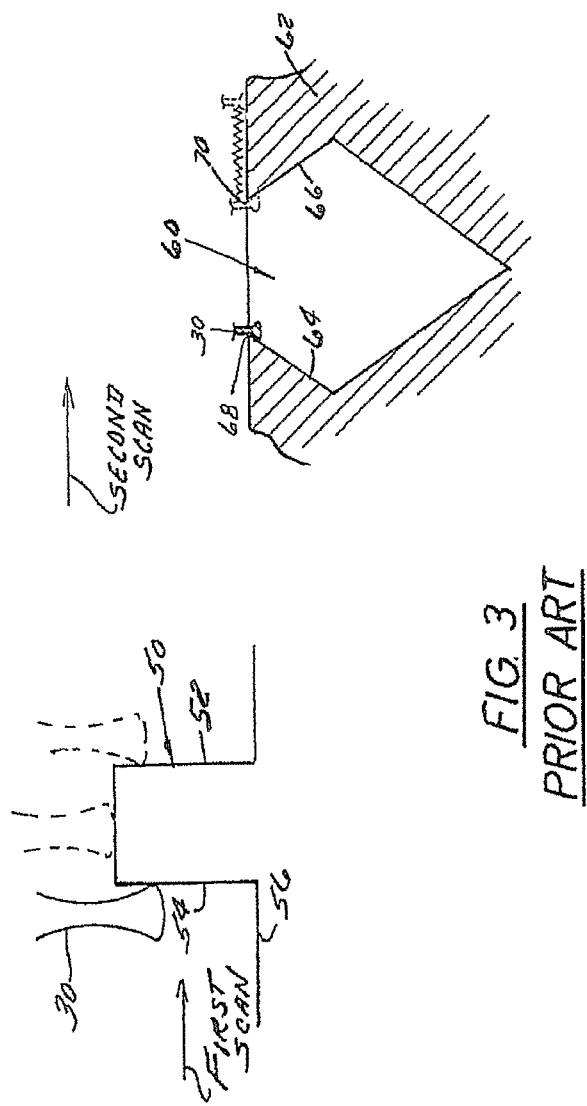
FIG. 3 is a somewhat schematic side elevation view of a prior art tip characterization procedure, labeled "PRIOR ART"

The tip 30 may be, but is not necessarily, a "boot shaped" tip commonly used for CD scans as described briefly above in conjunction with FIGS. 1B and 2. Referring again to FIG. 2, tip 30 is generally cylindrical in shape with noted exceptions. Specifically, it has protuberances 32 and 34 at its bottom end 36 that extend outwardly when compared to the adjacent vertical section or shaft 37 of the tip 30. The shaft 37 also is "flared" so as to increase in diameter as one proceeds upwardly from its bottom end. The resulting tip 30 has several characteristic dimensions that affect probe/sample interaction and that may contribute to image dilation. These dimensions include:

Protuberance edge radius (PER);
tip width (TX);
specific overhang length (OX);
vertical edge height (VEZ);
operating length start (OZS);
operating length end (OZE);
effective height (EZ);
maximum overhang height (OZMAX); and
maximum overhang width (OXMAX)

Any or all of these dimensions can contribute to the dilation of the scanned image, and many vary significantly from tip to tip. For instance, tip width, edge radius, overhang width, maximum overhang width, maximum overhang length, and vertical edge height all are highly dependent on the shape of the protuberances 32 and 34. Effective length, maximum overhang width, maximum overhang height, and operating length start and end are dependent both on the shape of the protuberances and on the flare of the shaft 37. Many of these dimensions also vary with time for a particular tip due to wear or breakage as a result of tip/sample interaction. In use, the tip width and vertical edge height are frequently considered to be the most critical parameters.

In order to permit reconstruction of the dilated image, the tip 30 is characterized using a characterizer constructed in accordance with the present invention. Preferred embodiments of carbon nanotube (CNT) characterizers will now be described, it being understood that the invention is applicable to other characterizers as well, such as carbon wires and non-carbon wires or filaments.

The preferred characterizer comprises a carbon nanotube (CNT) that is situated so as to be capable of being engaged by the bottom and sides of the tip 30. Specifically, the CNT is situated so that it is disposed at a height that permits the tip 30 to engage the CNT without interference from any structure below the CNT. Preferably, the CNT is situated so as to extend across the top of a trench. At least one end of it is preferably held in tension so as to reduce or eliminate the effects of CNT bending on tip characterization. A CNT will now be described, followed by preferred techniques for mounting CNTs across a trench.

CNTs are cylindrical structures of trivalent carbon forming hexagonal lattice sheets rolled to form hollow tubes. CNTs having layered walls to form multiwalled CNTs (MWCNTs) could be used as tip characterizers. However, single-walled CNTs (SWCNTs) are, at present, more readily obtained than MWCNTs and are very well characterized in spatial dimensions. SWCNTs therefore are presently preferred.

Figure 5A:
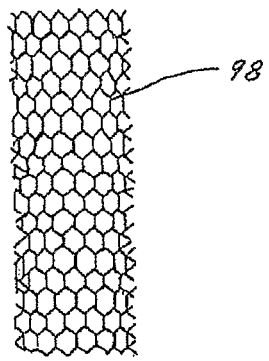
FIG. 5A is a side elevation view of a carbon nanotube (CNT) usable as a characterizer constructed in accordance with a preferred embodiment of the present invention.
Figure 5B:
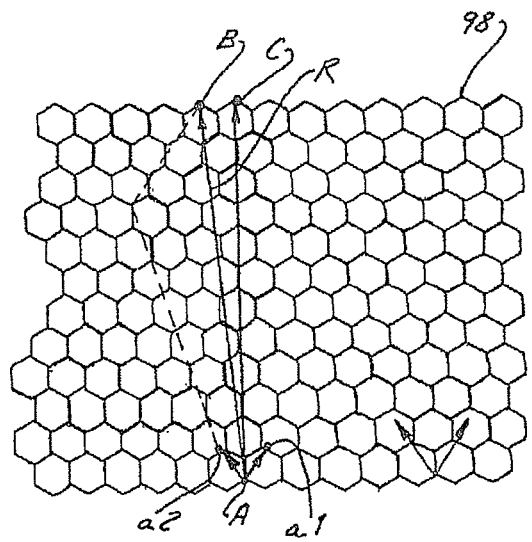
FIG. 5B is a top plan view of honeycomb structure of a graphite sheet formed by "unrolling" the CNT of FIG. 5A.

FIG. 5A illustrates a SWCNT 98 which is "unrolled" in FIG. 5B. When the sheet is rolled into a tube, the points A and B connect. The vector between connecting points A and B is known as the "chiral vector" R. The chiral vector R has component unit vectors a1 and a2. These vectors are defined in terms of an "armchair line", A to C. The armchair line is the shortest line that crosses the unraveled tube and that bisects hexagons. The component vectors a1 and a2 lie above and below the armchair line, as shown in the FIG. 5B. The chiral vector R in this illustration equals the sum of four a1 vectors and two a2 vectors, as shown by the broken line vectors. Hence, the chiral vector for the illustrated SWCNT is expressed as (4,2). If the tube were rolled so that points A and C were connected, then the chiral vector would be (3,3) and lie along the armchair line. The SWCNT could also be rolled so that point A connected to point D or point E, for example.

The chiral vector precisely defines the diameter of a defect free CNT. Where the components of the chiral vector are (n, m), the tube diameter, d, is given in nanometers by the formula:

$$d = 0.0883\sqrt{(n^2 + m^2 + mn)} \qquad \text{Equation 2}$$

CNTs are among the strongest and most resilient materials known to exist. A SWCNT has a Young's Modulus of 1.2 TPA and a tensile strength that is an order of magnitude higher than that of steel. It can also tolerate large strains before mechanical failure. Depending on its chirality vector, it also can be highly conductive. SWCNTs can be prepared with diameters ranging from a few Angstroms to several tens of nanometers. SWCNTs over about 3 nm in diameter have the disadvantage of showing a tendency to collapse. SWCNTs having a diameter from about 0.4 to about 2.7, and more preferably of 0.8 to about 1.7, nm are desired. Although the above ranges are provided by way of example, other dimensional ranges also may be employed and are contemplated as falling with the scope of the present invention. By selecting the conditions of formation, SWCNTs all having the same chiral vector and few or no defects can be manufactured. As a result, SWCNTs are highly uniform in diameter, typically exhibiting a lot-to-lot diameter variation of less than 10 nm and more typically of on the order of 1 nm. They may have lengths of hundreds of microns or even centimeters.

A variety of techniques are available for making SWCNTs and other CNTs. One commonly used technique is laser ablation of a heated carbon target that has been treated with a metal catalyst, usually, nickel cobalt, iron, or a mixture thereof. Another method uses a DC carbon arc to vaporize a metal catalyst impregnated carbon electrode. A selection process may be employed to sort the CNTs based on size or defect occurrence. CNTs and they use as reference structures for SPM probes are disclosed in U.S. Pat. Nos. 6,354,133 and 6,591,658, the subject matter both of which is hereby incorporated by reference in its entirety CNTs including SWCNTs have several characteristics that render them very well-suited for use as re-entrant tip characterizers.

First, because they are cylindrical, they can be engaged by both the bottom and proturberances of a CD tip, providing data about the tip that is both width and length dependent. Hence, all tip dimensions of interest, even all dimensions of a CD or other re-entrant tips, can be obtained by scanning a CNT in a single pass. This dramatically increases throughput when compared to the prior two-step IVPS+SOCS characterization technique.

Second, if, as is the case in the preferred embodiment, the CNT or wire is freely suspended from adjacent support structures, the characterizes/tip contact can be maintained about the entire active region of the CD tip, including all re-entrant regions above the lateral protuberances of the tip. This eliminates "blind zones" that are currently present in highly re-entrant tips that are reconstructed using a SOCS type characterizer in which the included angle of the contact structure is 54.7°.

Third, due to their molecular structure, the diameters of CNTs including SWCNTs are highly uniform along the length of a given tube and with minimal lot-to-lot variation. As should be apparent from the above discussion, the diameter of a SWCNT can be known to within the 5 nm and even to within 3 nm or less (on the order of 1 nm). This represents a dramatic improvement over both IVPS and SOCS. Recall, for instance, that IVPSs must be carefully calibrated using a gold line or the like because of substantial lot-to-lot variations. Also recall that it is necessary to precisely register the tip with an IVPS to assure repeatability. Recall also the edge radius of a SOCS must be assumed and that this assumption is often incorrect. Because a CNT lacks any of these drawbacks, a dilated image can be reconstructed with a high level of precision of less than 5 nm, preferably less than 3 nm, and even more preferably of less than 1 nm.

Fourth, because SWCNT have diameters ranging from 1 to 3 nm, higher resolution imaging can acquired on the tip surface when compared to existing SOCS type structures.

Fifth, CNTs including SWCNTs are much more durable than a SOCS characterizer because the CNT wears much more slowly. In fact, comparisons of silicon tip characteristics to carbon tip characteristics reveal that carbon tips wear at a rate that is at least an order of magnitude slower than the wear rates for silicon tips. That is, the tip life for a carbon tip is typically about 4000 to 5000 scans, versus about 200 scans for a silicon tip. A CNT characterizer can be expected to enjoy at least a similarly increased life span when compared to an SOCS characterizer.

Sixth, tips can be characterized with very high repeatability. Recall that the edges of SOCSs wear or even break as a result of repeated characterization scans and that such wear or breakage is impossible to detect. Hence, even if an initial characterization results in a highly accurate reconstruction of a dilated image, subsequent scans occurring during the AFM imaging process lead to an increasingly low-resolution in characterization and a resulting decrease in image reconstruction. CNTs including SWCNTs in particular do not exhibit the edge radius uncertainty associated with an SOCS due to the nature in which they wear and fail. Specifically, as discussed above, a CNT initially has an extremely uniform diameter along its principal axis. If any significant reduction in wall thickness occurs at any point on the CNT, the modulus at that point drops dramatically, likely leading to catastrophic failure of the CNT. This failure can be detected by measuring the mechanical, electrical or electromechanical properties of the CNT at the tip/nanotube interaction site (NAT site). Once a given NAT site is flagged as a damaged characterizer, another NAT site can be selected for tip characterization simply by moving the probe to an undamaged CNT or, in the case of only a partial failure of the CNT, to an undamaged portion of the damaged CNT.

Figure 6:
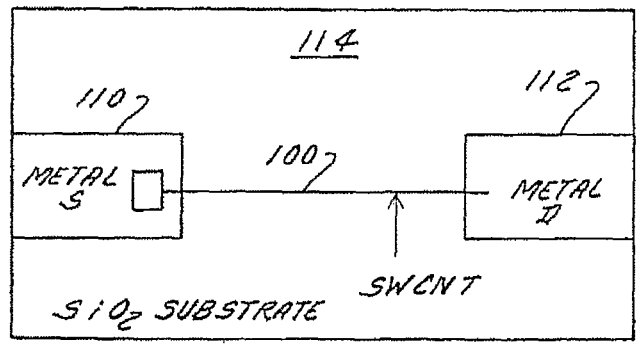
FIG. 6 is as schematic top plan view of a CNT having ends connected to metal electrodes (or conductive "pads")

One preferred technique for detecting CNT failure is based on the fact that CNTs can be formed to be electrically conductive. As such, partial or complete CNT failure can be detected if the conductivity or resistivity is passively monitored in situ and exhibits a sharp decrease or disappears entirely. This monitoring, of course, requires that the CNT 100 be placed in contact with electrodes or pads 110 and 112 as seen in FIG. 6. Several techniques for achieving this effect are discussed in Dai, Surface Science, Volume 500, pages 218-241, 2002, the subject matter of which is incorporated by reference by way of background. For instance, individual SWCNTs can be grown on a silicon oxide substrate 114 by laser ablation by depositing SWCNTs from liquid suspensions onto predefined electrodes 110 and 112. SWCNTs on the substrate 114 can also be located by an AFM or similar instrument, and electrodes 110 and 112 can then be placed into contact with the CNT ends. A growth and integration method, developed by the Stanford University, also can be used to contact SWCNTs grown from patterned catalyst islands. That method has the advantage of producing large numbers of individually addressable CNTs. Complex CNT electrical devices have also been obtained by various approaches. These devices include intra-tube heterojunctions containing sharp kinks at the junctions, CNT crosses and substrates, and cross structures of suspended CNTs.

Measurement of variable resistance devices such as a strained or distorted CNT are commonplace within electrical engineering practice. An example of but two methods are to place the variable resistance as an element in a Wheatstone Bridge or to use the variable resistance in a circuit with a capacitor and a frequency source. A preferred embodiment would use the circuit in-situ on the silicon characterizer substrate.

Figure 7:
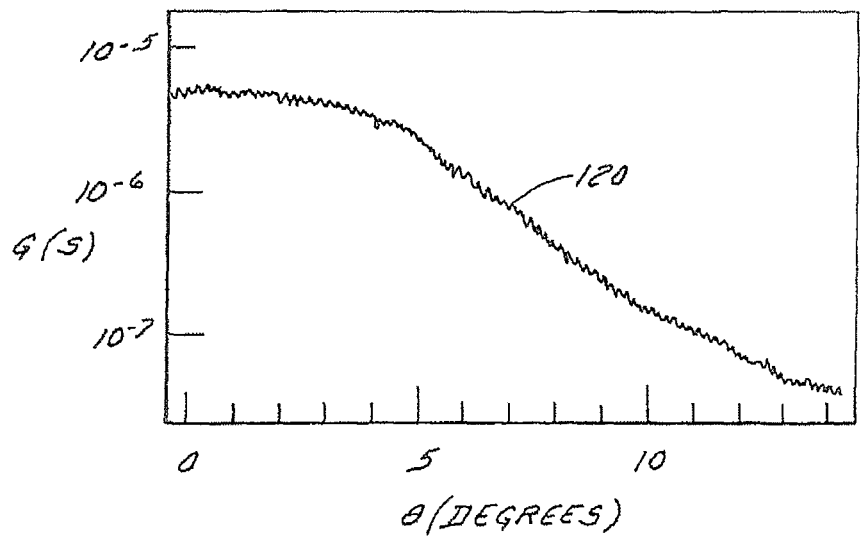
FIG. 7 is a graph of conductance versus deflection of a single walled carbon nanotube (SWCNT) usable as a characterizer in accordance with the present invention.

It is conceivable that CNT integrity can also be monitored actively rather than passively. This possibility is based on the recognition of the fact that the conductance of CNTs is dramatically higher at relatively high bending angles than at relatively low bending angles. This effect is illustrated by the curve 120 in FIG. 7, which shows that a SWCNT's conductance decreases relatively slowly for small bending angles of on the order of less than 5° and becomes more dramatic at higher bending angles. More specifically, an investigation of measured force and conduction versus deflection that was conducted as a 3.1 nm diameter SWCNT was deflected over a 605 nm wide trench etched in $SiO_2$ revealed that, for small deflections on the order of 5° or less, deflection was proportional to applied force. Resistance thereafter rose dramatically from 200 Kohms at 5° to 25 mohms as deflection increased to 14° with a 3% average strain.

The high sensitivity of CNT resistance to large deflections can be used to actively check the integrity of a CNT. If a section of a CNT has partially or completely failed, it will deform much more under a relatively low applied force than it would if its integrity were perfect. The integrity of a CNT can thus be checked by monitoring its resistance while it is interacting with a probe with a controlled force known to bend an undamaged CNT by less than, for example, 5°. If the monitored conductance decreases significantly as a result of the impact, a tube failure can be assumed. Alternatively, CNT deflection can be monitored directly as a function of applied force and, if a higher-than-expected deflection is detected, partial or complete CNT failure can be assumed to have occurred. This monitoring could be performed either prior to or after the characterization step during the AFM's operational cycle.

As discussed briefly above, the CNT should be suspended over a trench or some other recess that permits the tip to engage the CNT without interference from the surrounding substrate. It can therefore be thought of a "cross trench characterizer." Preferably, but not necessarily, it should also be held securely at both ends to prevent or at least limit deflection or bending of the CNT as a whole. Such bending, if permitted, would be reflected in the acquired image as erroneous tip shape data. The presently-preferred technique for achieving these goals is to suspend a CNT 130 perpendicularly across a trench 132 as shown schematically in FIG. 8. The tip 30 can then be characterized by scanning it along the axis of the trench 132 until it encounters the CNT 130, and then scanning it up and over the CNT 130 in any desired manner.

Several techniques are available for holding the nanotube over a trench or similar structure. One, illustrated schematically in FIG. 8, comprises embedding at least one of the ends 136 and 138 of a trench-crossing CNT 130 into the silicon oxide or other substrate 140 containing the trench 132.

Figure 9A:
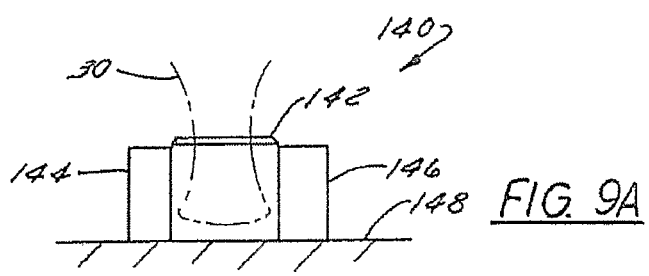
FIG. 9A is a sectional end view of a CNT cross trench characterizer constructed in accordance with a second preferred embodiment of the invention.
Figure 9B:
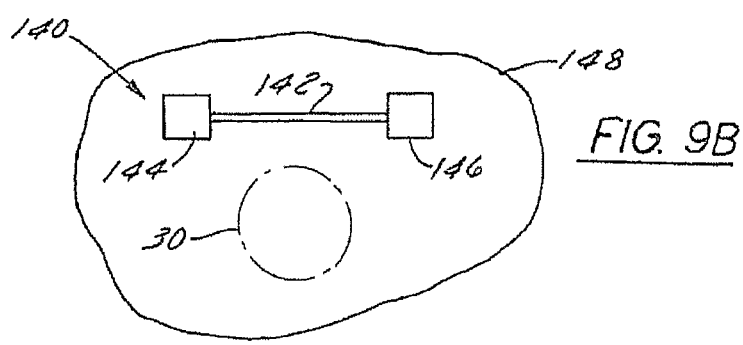
FIG. 9B is a top plan view of the CNT cross trench characterizer of FIG. 9A.

A more commercially feasible cross-trench characterizer 140 is illustrated in FIGS. 9A and 9B. Characterizer 140 comprises a CNT 142 suspended between lithographically patterned pillars or posts 144 and 146 extending upwardly from the surface of a silicon oxide substrate 148. The patterning process should be controlled such that the posts 144 and 146 are spaced far enough apart to form an effective trench that can accommodate the tip between them. Catalytic sites, formed from nickel cobalt, iron, or another suitable metal, are then formed on top of the posts 144 and 146. One or more hydrocarbon gases, typically methane, is then deposited on the catalytic materials by chemical vapor depositioning (CVD). During CVD growth, the outermost walls of the CNTs 142 interact with their neighbors via van der Waals forces to form a bundle, which allows the CNTs to self-orientate and grow perpendicularly to the surface of the substrate. During the CVD process, CNTs are nucleated in the top of the posts 144 and 146 and propagate linearly as they grow. The methane flow prevents the CNTs from "floating" or waving due to the fact that the methane flow velocity near the bottom substrate surface is substantially lower than at that level of the tops of the posts 144 and 146. This prevents the CNTs from being "caught" by the substrate surface or the bottoms of the posts 144 and 146. Nearby posts, on the other hand, provide fixation points for the propagating tubes. If a CNT growing from one post 144 contacts a nearby post 146, the tube post van der Waals attraction will "catch" the CNT 142 and hold it aloft. SWCNTs as long as 0.2 mm can be grown in this fashion.

Hence, CVD of methane using these substrates leads to suspended CNTs forming nearly ordered networks and CNT orientations directed by the pattern of the posts 144 and 146. If desired for monitoring purposes, electrodes can also be placed on top of the posts 144 and 146 using one of the techniques described above.

In practice, the orientation of the CNTs will depend upon the post pattern which, in turn, is determined by selection of the lithographic pattern used to form the posts.

Figure 10:
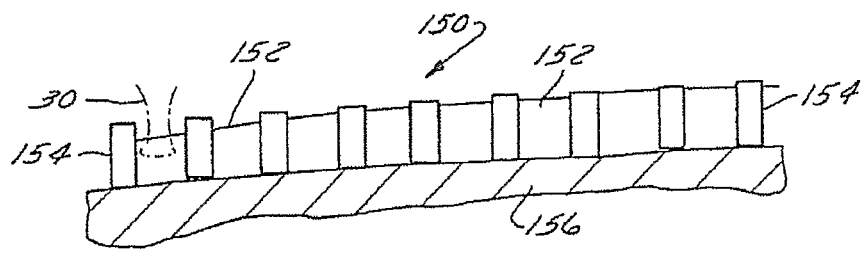
FIG. 10 is a sectional end elevation view of a first practical application of the characterizer of FIGS. 9A and 9B.

For instance, a suspended row of CNTs 152 could be formed and strung along a row of aligned posts 154 like a power line as seen in FIG. 10. If desired, electrodes can then be placed on or over the ends of the CNTs as described above. The resulting characterizer 150 would have a number of aligned cross-trench CNTs available for tip characterization.

Figure 11:
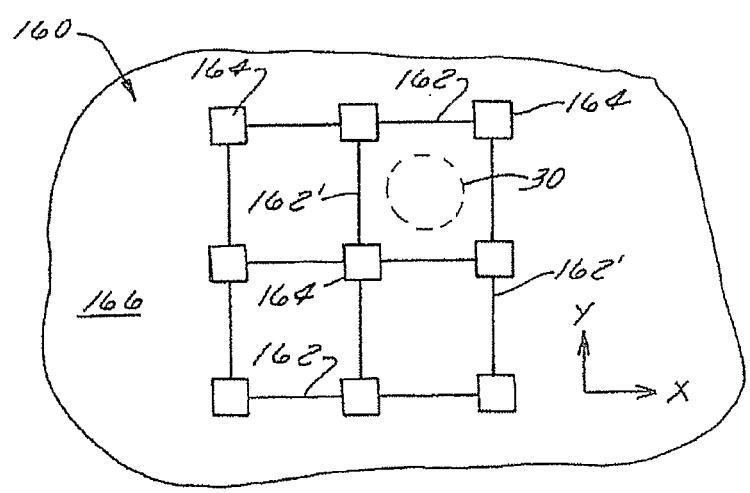
FIG. 11 is a top plan view of a second practical application of the characterizer of FIGS. 9A in 9B.

As illustrated in FIG. 11, a characterizer 160 can be formed by growing a square or rectangular network of suspended SWCNTs 162, 162' on an array of silicon pillars 164 extending upwardly from a substrate 166. Electrodes can then the placed on or over the ends of the CNTs as described above, if desired. An advantage of providing CNTs in a rectangular or an array of rectangles is that the CNTs extend in both the x and y directions. As such, a probe tip 30 can be positioned within a rectangle as seen in FIG. 11 and characterized in both the x and y directions by operatively engaging either one of the y extending CNTs 162 or the x extending CNTs 162, respectively. This ability is commercially significant because customers are increasingly demanding three-dimensional information concerning transistors and other measured objects. Three dimensional imaging, of course, ideally requires scanning in both the x and y directions. A characterizing technique that characterizes the tip 30 in only one of these directions therefore would only partially optimize reconstruction of an image from a dilated image.

Another advantage a CNT-based characterizer over SOCS-based characterizer should be noted at this time. Specifically, the scan size required to locate and characterize the tip is dramatically smaller for CNT-based characterization, further increasing throughput. That is, the recess that forms the typical SOCS is relatively wide, typically in the order of 10 microns. The edge of that recess must be located for characterization. In contrast, there is no need to locate a trench edge during CNT-based characterization because the tip 30 can contact the CNT at any location along its length. (In addition, the typical trench is an order of magnitude narrower than the typical SOCS cavity.) The edge locating step required for SOCS-based characterization can thus be eliminated. It is necessary to locate a tube within a trench for CNT-based characterization, but that process can be facilitated substantially by controlling the post-formation procedure to form a tight array of trench-crossing CNTs. Specifically, the post-forming procedure can be controlled to provide post spacing of less than 200 nm, more preferably of less than 100 nm, and even of 50 nm or less. Locating a CNT in such a short trench at scan speeds heretofore used for SOCS-based characterization therefore requires, at most, five minutes and more typically only one or two minutes or less.

This once again highlights the increase in throughput of the preferred embodiment of the present invention when compared to the prior art IVPS+SOCS technique. More specifically, the best-case characterization scan scenario for the prior art technique, including engaging and scanning the IVPS, moving the probe tip to the SOCS, and locating and scanning the SOCS, takes at least about six to eight minutes. In contrast, the CNT-based characterization technique described herein can virtually always be performed in less than five minutes and can often be performed in two minutes or less or even one minute or less.

Figure 12:
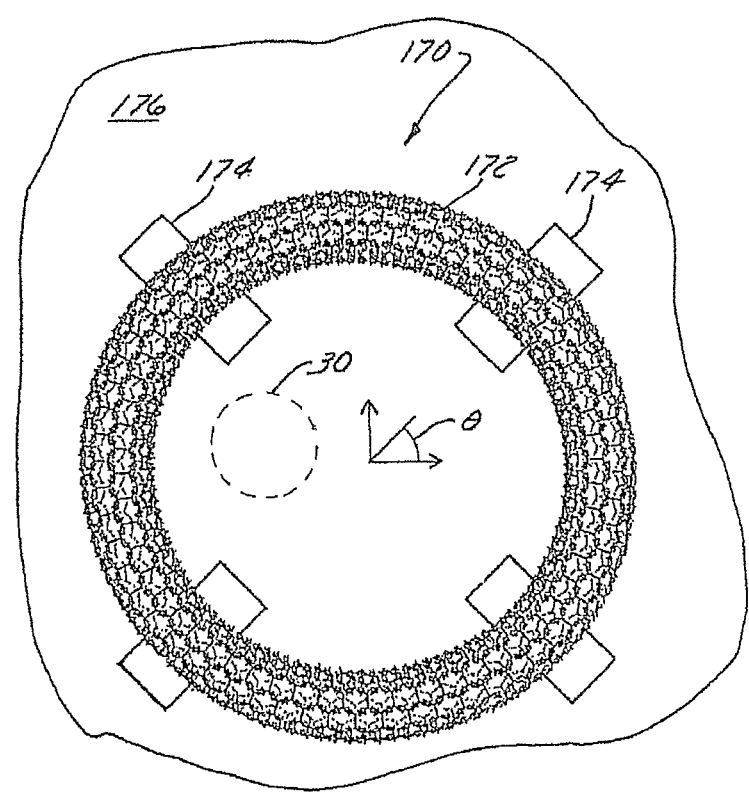
FIG. 12 is a top plan view of a third practical application of the characterizer of FIGS. 9A and 9B.

CNTs can also be formed as rings as described, for example, in "Colossal Paramagnetic Moments in Metallic Carbon Nanotori", Liu at al., Physics Review Letters, Vol. 88, No. 21, May 27, 2002, the subject matter of which is hereby incorporated by reference. If such a circular CNT 172 were to be grown over posts 174 extending upwardly from a substrate 176 as seen in FIG. 12, the resulting characterizer 170 would have accurate trenches between posts 174. With this geometry, AFM tip 30 could be moved in any direction within the x-y and engage the CNT, resulting in even more precise three-dimensional tip characterization and even better subsequent image reconstruction.

Figure 8:
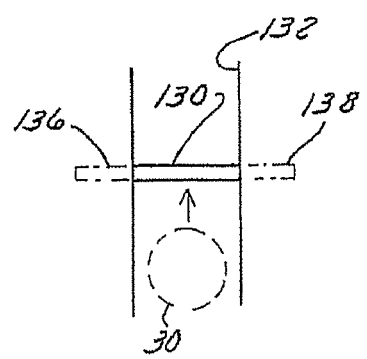
FIG. 8 is a top plan view of a CNT cross trench characterizer constructed in accordance with a first preferred embodiment of the invention and showing the CD tip about to interact with the CNT.
Figure 13:
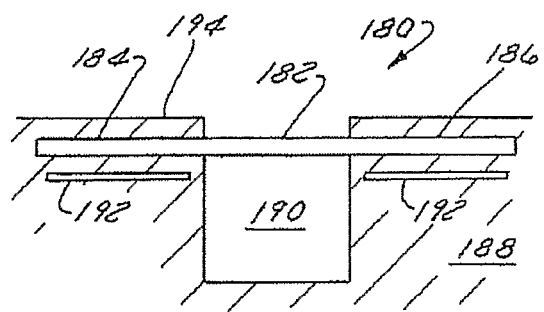
FIG. 13 is a sectional side elevation view illustrating a technique for tensioning a cross trench tip characterizer.

Simply embedding the ends of the CNT in the substrate (as in FIG. 8 or suspending them from posts (as in FIGS. 9-12) may tension the CNT sufficiently to reduce the effects of CNT bending on tip characterization to acceptable levels. If desired, techniques may be employed to additionally tension the CNT. One such technique is illustrated in FIG. 13, which shows a characterizer 180 in which the ends 184 and 86 of a CNT 182 are embedded in a silicon oxide substrate 188 on opposite sides of a trench 190 as described generally above in connection with FIG. 8. A resistive heating element 192 is embedded in the substrate 188 on opposite sides of a trench 190. By applying electrical current to the heating element 192, the substrate's top surface 194 expands to apply additional tension to the CNT 192.

The imaging of the tip 30 to obtain the characterization data from a characterizer such as the characterizers 150, 160, 170, or 180 described above can be performed in any desired manner. In one preferred embodiment, the AFM actuator 94 of the AFM 80 (FIG. 4) drives the probe 82 toward a crosstrench CNT in the x direction while driving the probe to oscillate in oscillation mode such as TappingMode™ if the tip in non-re-entrant or 2-D scanning mode for CD tips. The amplitude or phase of this oscillation is kept constant during scanning using feedback signals, which are generated in response to the interaction between the tip 30 and the CNT to provide data indicative of the tip shape. This interaction may stop short of actual tip/CNT contact but, instead, may reflect near-surface effects such as van der Waals forces. Indeed, selecting a setpoint that responds to near-surface effects rather than actual tip/CNT contact can reduce tip or characterizer wear and prevent tip or characterizer breakage. These feedback signals are then collected, stored, and used as data to characterize the tip 30. In addition to being used during the subsequent image reconstruction process, the resultant data could be displayed either directly or after being combined with some other image-dependent data.

A method of reconstructing (or "deconvolving") a dilated image using data obtained by tip characterization will now be described in conjunction with the AFM of FIG. 4. The preferred method, as well as alternative methods for achieving that affect, are described in U.S. Pat. No. 7,143,005 to Veeco Instruments, the subject matter of which is hereby incorporated by reference in its entirety.

Figure 14:
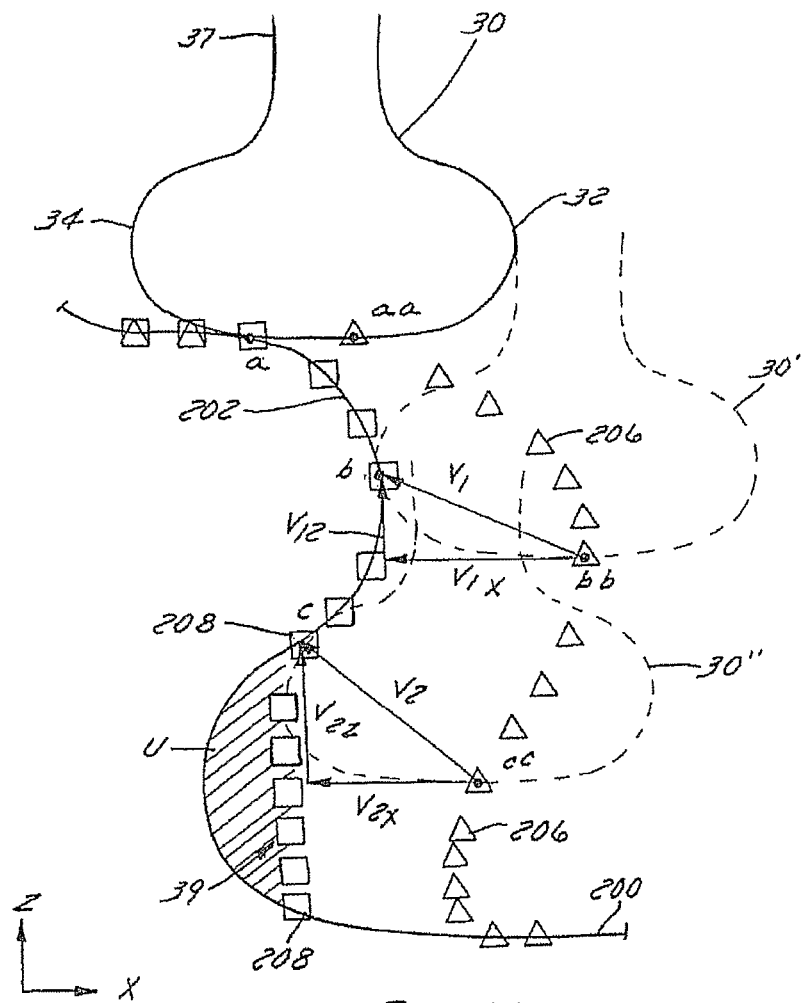
FIG. 14 schematically illustrates the interaction between a CD probe tip of a SPM and a sample feature during imaging.

Turning to FIG. 14, the boot-shaped CD probe tip 30 of FIG. 2 of the probe 82 AFM 80 (See FIG. 4) is scanned across a trench wall 202 of a sample 200 in a scan that may include a reverse or re-entrant scan. Recall that probe tip 30 includes protuberances 32 and 34. The scan shown was initially conducted from upper left to lower right along the trench wall, 202 thus obtaining the data represented by the series of triangles 206. The acquired data represented by the triangles 206 is the dilated data that must be corrected to account for the shape of tip 30. The dilated data is generated using a fixed reference point for tip 30, for example, the mid-point "x" of tip 30 at its distal end. Importantly, this reference point "x" is typically displaced from the point of interaction between the wall 202 and probe 30. That point is often located on an entirely different portion of the tip 30, such as on the protuberance 34. The actual points of contact are represented by the rectangles 208 in FIG. 14.

With continued reference to FIG. 14, probe tip 30 is shown in three positions as it progresses from left-to-right in the scan direction. Like pairs of letters, for example, a-aa, represent the point of contact between probe tip 30 and sample feature 202, and the corresponding position of the selected reference point (i.e., "x") on the AFM 30 tip used to produce the dilated image profile, respectively. As such, the distance and direction (i.e., vector) between the points of each pair (e.g., a-aa, b-bb and c-cc) is the amount by which the AFM image data must be corrected to produce the desired reconstructed image. The preferred embodiment provides this correction, as illustrated by the series of square blocks in FIG. 14.

Two of the correction vectors applied according to the present embodiment are shown. When it is at position 30', tip 30 contacts sample 202 at point "b," and reference point "x" is at "bb." The preferred embodiment operates to correct the difference between these two points (i.e., the dilation) by analyzing tip-sample surface normals (described below) to identify a correction factor, for example, a correction vector $V_1$, having orthogonal components $V_{1x}$ and $V_{1z}$. Similarly, when tip 30 is at position 30", it contacts sidewall 202 at point "c," thus generating data image point "cc." Method 280 (FIG. 16) operates to determine and apply correction vector $V_2$ to translate point "cc" to "c," thus extracting the shape of tip 30 at the contact point "c" from the dilated image.

As discussed in further detail below, the vertical portion of the dilated image data, and the corresponding vertical portion 39 of the reconstructed image (i.e., square blocks) at about the undercut region "U" of sidewall 202 is caused by the shaft 37 of tip 30 contacting surface 202 at about an overhanging point "b" of the sidewall 202. In other words, the left side 34 of tip 30 does not contact sidewall 202 at about point 35 of the image data. As a result, with shaft portion 37 of the tip 30 contacting the overhang, the portion of the undercut region "U" to the left of the vertical line of square blocks (i.e., corrected data) is "shaded," due to no tip-sample contact in that region. Imaging the "shaded" region "U" would require a tip with greater overhang.

Figure 15:
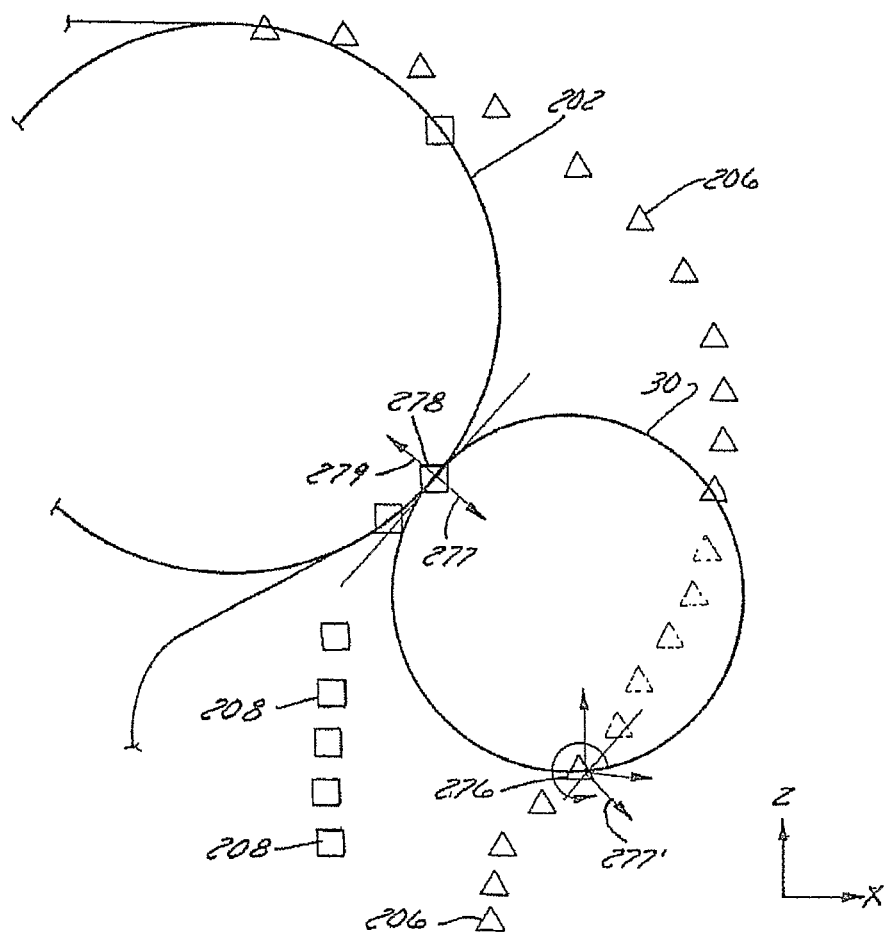
FIG. 15 schematically illustrates a method for reconstructing a dilated image obtained from FIG. 14.

Turning to FIG. 15, the geometry of tip-sample interaction during AFM data acquisition is shown. To illustrate this geometry for any particular point of contact between probe tip 30 and sample feature 202 can be shown idealized in 2-D cross-section as circles, whereby a point of contact 278 sits in a tangential plane at the interface of the two structures. Importantly, at point of contact 278, the surface normals 277, 279 to the tangential plane are equal and opposite for sample 202 and probe 30, respectively. When utilizing a tip that has a shape defining surface points characterized by a series of unique surface normals (as in FIG. 15), these surface normals can be compared to the AFM image data to identify the exact point of contact of the tip on the surface. Note that "equal surface normals" indicates that the normals extend in the same direction.

More particularly, the tip shape at each point is reflected in the data recorded by the SPM as the slope and indicated slope direction of the data at that point. By computing the slope and indicated slope direction of the SPM image data (for example, relative to the scan direction or the X axis of the X-Z plane) and knowing the scan direction, the image unit surface normal at point 276 is 277'. At the tip sample contact point 278, the sample unit surface normal 277 is the same. With this information, the point of contact of the tip 30 on the sidewall 202 of the sample 200 can be determined. Again, the surface normal 279 associated with the probe tip contact point will be equal to and opposite of the sample unit surface normal 277. By knowing surface normal 279, an appropriate correction vector (previously computed upon characterization of the probe tip) associated with surface normal 279 can be applied to point 276.

As highlighted previously, as the SPM 80 (FIG. 4) continues to scan the sample 200, the point of contact translates along the tip surface, thus typically defining a new tangential plane, and a new surface normal. Because the presently described technique is able to determine this point of tip contact at each point in the scan data (assuming unique surface normals associated with the active region of the tip), appropriate correction vectors for each scan point can be determined, and a reconstructed image of the sample surface can be generated. As a result, the dilation error introduced by the tip shape is essentially eliminated.

In sum, because the tip shape is "convolved" in the SPM image data and the surface normal of the contact point of the tip 30 is equal and opposite to the sample surface normal at that point, the point of contact of the tip 30 on the sample 200 can be determined. This is achieved by computing the local slope of the SPM image data which corresponds to the single point of contact of the tip on the sample, and then by identifying a corresponding surface normal. As correction vectors associated with the identified surface normals are determined using the data corresponding to the point of tip contact on a point-by-point basis, a reconstructed image having a high degree of accuracy can be achieved in a way that is not computationally intensive. The production of this reconstructed image will now be described in conjunction with a description of the method shown schematically at 280 in FIG. 16. This method preferably is implemented in the controller 92 of the AFM 80 of FIG. 4 but could be implemented in whole or in part in a separate on border offboard controller on the AFM or another device entirely.

Figure 16:
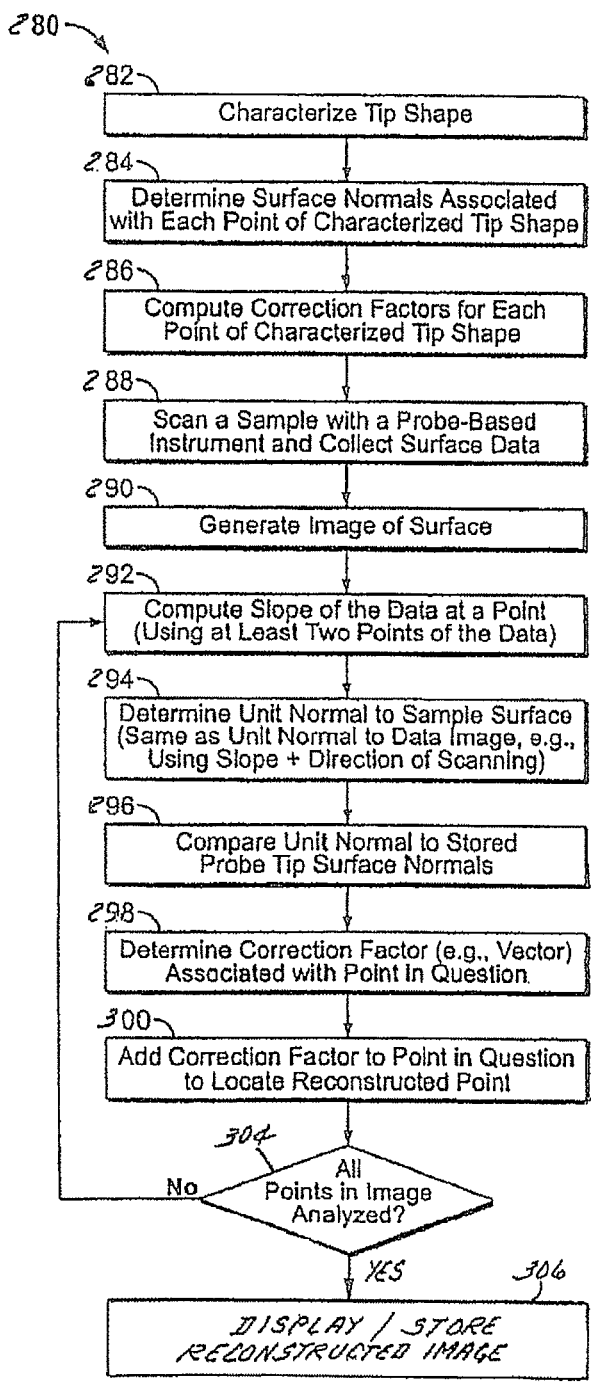
FIG. 16 is a flowchart of an image reconstruction technique that can be used to reconstruct a dilated image using tip characterization data.

The method 280 of FIG. 16 begins with Block 282, where the shape of the tip 30 is characterized using one of the CNT-based characterization procedures described above. More particularly, at least the portions of the tip 30 that are capable of engaging a surface feature of interest are characterized on a point-by-point basis using that procedure. These portions will typically include at least the bottom 36 and protuberances 32 and 34 of the tip 30. Desired dimensions such as vertical edge height and protuberance edge radius can be determined. The characterizing step 282 can be performed prior to every scan, if desired. However, tip wear or breakage occurs at a sufficiently low rate in most applications that several different sites can be scanned before the tip needs to be recharacterized. The number of sites that can be scanned before the tip needs to be recharacterized may vary with operator preference and sample properties. For instance, when the operator desires high precision and the tip 30 is scanning a relatively abrasive material such as polysilicon, it may be desirable to recharacterize the tip 30 after scanning only two-to-three sites. Conversely, if the tip 30 is being used to scan a less abrasive material such as silicon or a biological sample and/or the operator is less concerned about precision, the tip 30 may be used to scan ten or more sites before it is recharacterized for wear, breakage or inspection for contamination.

The method 280 then proceeds to Block 284, wherein it determines surface normals associated with several points on the active region of the surface of the probe. These surface normals extend orthogonally outwardly from the surface of the probe tip 30. Preferably, the surface normals are compiled as corresponding to particular angles θ (FIG. 14) in X-Z space to identify the characterized points or regions of the tip surface. For three dimensional X-Y-Z space using polar coordinate, r is a distance scalar, a first angle θ and a second angle φ are then used to define the surface normals, where r ranges from 0 to N nm, θ is 0 to 360°, and φ is 0 to 180°.

After the tip shape is characterized, appropriate correction factors are determined for each point or region of the active portion of the probe tip 30 in Block 286. These correction factors are computed relative to a reference point of the probe tip, i.e., the point of the tip used to plot the image data acquired by the AFM. These correction factors may be a convenient ΔX and ΔZ (see FIG. 14) (or ΔX, ΔY, ΔZ in X-Y-Z space) of a correction vector, or more complex equations associated with the characterized point or region. The correction vectors are then compiled, together with their associated surface normals, and stored for ready access and application during image reconstruction. For example, the array of surface normals may be stored in a look-up table along with the corresponding correction vectors for ready access during image reconstruction.

Then, in Block 288, a scan of a selected sample with the AFM 80 is performed using any desired technique, such as a so-called "raster scan" in which the probe 82 is scanned in the x direction along a number of closely spaced lines in the y direction.

In Block 290, method 280 optionally acquires an image profile of the sample surface as the scan is conducted. Of course, this is the dilated data obtained by the AFM, i.e., the uncorrected data.

Next, method 280 computes the slope and slope direction of the image profile for a region (e.g., associated with a point) along the profile using at least two points of the acquired raw data in Block 292. This slope may be measured relative to the scan direction (X axis) as ΔZ/ΔX when correcting two-dimensional data. Similarly, for three-dimensional data, the slope of the tangential plane described previously may be measured relative to the XY plane. In Block 294, method 280 determines the unit normal (77 in FIG. 15) to the sample surface for that point based on the slope and the direction of scanning. Notably, with respect to the direction of scanning, the sample unit surface normal is directed away from the "interior of the sample," for example, to the left when scanning and processing the image profile from left to right.

Thereafter, in Block 296, method 280, via a scalar distance r and an angle θ in a look-up table for example (2-dimensional; r, θ and φ for a 3-dimensional table), compares the unit normal associated with the dilated data (Block 294) to the stored surface normals associated with tip characterization. In Block 298, method 280 determines an appropriate correction factor associated with the unit normal for that point. Again, this determination is made based on the characterization of the tip shape (Block 282).

Knowing the appropriate correction factor (e.g., vector) for the current point of the image profile, method 280 plots a point of a corrected image profile (i.e., reconstructed image) in Block 300. Then, method 280 asks whether all points in the dilated image profile have been considered in Block 302. If not, Blocks 292 through 300 are repeated for at least several points in the image profile to build the corrected image profile, i.e., the profile that more closely resembles the actual sample surface. If the answer the inquiry of Block 304 is Yes, indicating that all point on the image have been analyzed, reconstruction is complete. The reconstructed image can then be displayed and/or data representative of that image can be stored in a memory of the AFM controller 92 and/or transmitted to some other computer or controller for further manipulation. These actions are shown generally at Block 306.

The method described above is but one method for re-entrant reconstruction as used in CD AFM. Additional methods are described in U.S. Pat. No. 7,143,005.

The reconstruction technique as thus far described does not take into account the effects of limited static nanotube deflection that may occur during the characterization step 282. For an cross trench CNT characterizer having a trench width of 100 nm and a CNT having a diameter of 3 nm and a Young's Modulus 1500 GPa, and 10 nN force applied by the CD AFM tip, the CNT should deflect less than ~2 nm upon the application of a 10 nN force by the tip. If the CNT is radially anisotropic (as one would expect) and the force applied by the tip is the same in Z and X directions, then the CNT will deform equally in the radial and axial directions. The effect of CNT deflection in the scan data can then be eliminated using the method of local slopes, or other method in a similar process as that used to remove the tip shape from the specimen image (i.e., in effect, modifying the effective cross-section of the CNT tube used in eroding the CNT from the tip/CNT scan.). In addition, if Z and X forces differ, but are known, then it is still possible to remove their resulting distortion of the image.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method comprising:
   (A) scanning a single characterizer with a re-entrant tip of a scanning probe microscope;
   (B) obtaining data from the scan to determine the shape of at least the portions of the re-entrant tip that can interact with vertical or undercut features of a sample during an imaging process; and
   (C) generating and at least one of storing, transmitting, and displaying an image of at least one of (1) the shape of at least the interacting portions of the tip and (2) an image formed by reconstructed image containing tip-dependent image portions.

2. The method of claim 1, wherein the tip is a critical dimension (CD) tip, and the obtaining step comprises obtaining data sufficient to determine the shape of protuberances on the tip.

3. The method of claim 2, wherein the obtaining step comprises obtaining data sufficient to determine at least one of protuberance edge radius (PER) and vertical edge height (VEZ).

4. The method of claim 1, wherein the obtaining step obtains tip width data with a repeatability of less than 100 nm lot-to-lot variation.

5. The method of claim 4, wherein the obtaining step obtains tip width data with a repeatability of less than 10 nm lot-to-lot variation.

6. The method of claim 5, wherein the obtaining step obtains tip depth width data with a repeatability of less than 1 nm lot-to-lot variation.

7. The method of claim 1, wherein the obtaining step is performed with a single scan of the characterizer.

8. The method of claim 1, wherein the characterizer is a carbon nanotube characterizer (CNT).

9. The method of claim 8, wherein the CNT is suspended over a void.

10. The method of claim 9, wherein the CNT is suspended across a trench.

11. The method of claim 8, wherein the CNT is suspended between posts extending upwardly from a substrate.

12. The method of claim 11, wherein the CNT is one of a plurality of CNTs suspended between aligned posts.

13. The method of claim 11, wherein the CNT is one of a plurality of CNTs suspended between an array of posts, and wherein the scanning step includes scanning at least two CNTs extending in different directions from one another.

14. The method of claim 8, wherein the CNT is a circular CNT, and wherein the scanning step includes scanning at least two different arcuate portions of the circular CNT.

15. The method of claim 8, wherein the CNT is a single walled carbon nanotube (SWCNT).

16. The method of claim 1, further comprising monitoring the integrity of the characterizer in situ prior to or during the scanning step.

17. The method of claim 16, wherein the monitoring step comprises determining that the integrity of the characterizer has been compromised if the resistivity of the characterizer or a characteristic that reflects characterizer resistivity exceeds a designated threshold or change.

18. The method of claim 17, wherein the monitoring step is performed passively by monitoring the resistivity of the characterizer in situ.

19. The method of claim 17, wherein the monitoring step is performed actively by monitoring characterizer response to the application of a force on the characterizer.

20. The method of claim 1, wherein the scanning step comprises engaging a substrate containing the characterizer with the probe tip, locating the characterizer, and scanning the characterizer in less than 5 minutes.

21. The method of claim 20, wherein the scanning and obtaining steps are performed in less than 3 minutes.

22. The method of claim 20, wherein the scanning and obtaining steps are performed in 1 minute or less.

23. A method comprising:
   (A) scanning a single characterizer with a re-entrant tip of a scanning probe microscope, the scanning step comprising engaging a substrate containing the characterizer with the probe tip, locating the characterizer, and scanning the characterizer;
   (B) obtaining data from the scan to determine the shape of at least the portions of the re-entrant tip that can interact with vertical or undercut features of a sample during an imaging process; and
   (C) generating and at least one of storing, transmitting, and displaying an image of at least one of the shape of the interacting portions of the tip and a reconstructed image containing tip-dependent image portions, and wherein the scanning and obtaining steps are performed in less than 5 minutes.

24. The method of claim 23, wherein the scanning and obtaining steps are performed in less than 3 minutes.

25. The method of claim 23, wherein the scanning and obtaining steps are performed in 1 minute or less.

26. The method of claim 23, the obtaining step obtains tip width data with a repeatability of less than 10 nm lot-to-lot variation.

27. A scanning probe microscope (SPM) comprising:
   (A) means for scanning a single characterizer with a re-entrant tip of a scanning probe microscope; and
   (B) means for obtaining data from the scan to determine the shape of at least the portions of the re-entrant tip that interact with vertical or undercut features of a sample during an imaging process.

28. The method of claim 27, wherein the characterizer is a carbon nanotube characterizer (CNT) suspended over a void.

29. The method of claim 28, wherein the CNT is suspended over a trench.

30. The method of claim 27, further comprising means for monitoring the integrity of the characterizer in situ prior to or during the scanning operation.

31. The method of claim 27, wherein the means for scanning causes the probe tip to engage a substrate containing the characterizer, locate the characterizer, and scan the characterizer in less than 5 minutes.

32. A scanning probe microscope (SPM) comprising:
(A) a probe having a re-entrant probe tip;
(B) a sample support;
(C) an actuator that causes relative movement between the probe and the sample support in the x, y, and z directions;
(D) a displacement sensor that monitors probe movement; and
(E) a controller that is coupled to the actuator and to the displacement sensor, wherein the controller interacts with a single characterizer that is supported on the sample support to:
scan the characterizer with the re-entrant probe tip, and
obtain data from the scan to determine the shape of at least the portions of the re-entrant probe tip that interact with vertical or undercut features of a sample during an imaging process.

33. The method of claim 32, wherein the controller monitors the integrity of the characterizer in situ prior to or during the scan operation.

34. The method of claim 32, wherein the controller causes the re-entrant probe tip to engage a substrate containing the characterizer, locate the characterizer, and scan the characterizer in less than 5 minutes.

35. A method of determining a shape of reentrant tip of a scanning probe microscope, comprising:
(A) scanning a single carbon nanotube (CNT) characterizer with the re-entrant tip of the scanning probe microscope;
(B) using at least one programmed computer, manipulating data obtained from the scan to determine the shape of at least the portions of the re-entrant tip that can interact with vertical or undercut features of a sample during an imaging process, the data being sufficient to determine at least one of protuberance edge radius (PER) and vertical edge height (VEZ) of the tip; and
(C) using the at least one programmed computer, generating and at least one of storing, transmitting, and displaying an image of at least one of (1) the shape of at least the interacting portions of the tip and (2) an image formed by reconstructed image containing tip-dependent image portions.

* * * * *